(12) United States Patent
Lee et al.

(10) Patent No.: US 8,085,252 B1
(45) Date of Patent: Dec. 27, 2011

(54) METHOD AND APPARATUS TO DETERMINE DIRECTION OF MOTION IN A SENSOR ARRAY OF A TOUCH SENSING DEVICE

(75) Inventors: Mark R. Lee, Edmonds, WA (US); Christopher R. Hammer, Woodinville, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 834 days.

(21) Appl. No.: 12/129,497

(22) Filed: May 29, 2008

Related U.S. Application Data

(60) Provisional application No. 60/932,337, filed on May 29, 2007.

(51) Int. Cl.
*G06F 3/041* (2006.01)
(52) U.S. Cl. ............ 345/174; 178/18.03; 345/173
(58) Field of Classification Search .......... 345/173, 345/174, 168; 178/18.03
See application file for complete search history.

(56) References Cited

U.S. PATENT DOCUMENTS

| | | | | |
|---|---|---|---|---|
| 4,686,332 | A * | 8/1987 | Greanias et al. ............ | 345/173 |
| 5,657,434 | A * | 8/1997 | Yamamoto et al. .......... | 345/684 |
| 6,256,022 | B1 | 7/2001 | Manaresi et al. | |
| 6,611,257 | B1 * | 8/2003 | Dotson et al. ............... | 345/174 |
| 6,924,789 | B2 * | 8/2005 | Bick ............................ | 345/168 |
| 7,129,926 | B2 | 10/2006 | Mathiassen et al. | |
| 7,349,822 | B2 | 3/2008 | Sachs et al. | |
| 2007/0229466 | A1 | 10/2007 | Peng et al. | |
| 2007/0268269 | A1 | 11/2007 | Chang et al. | |
| 2007/0268270 | A1 | 11/2007 | Onodera et al. | |
| 2008/0048997 | A1 | 2/2008 | Gillespie et al. | |

FOREIGN PATENT DOCUMENTS

| | | |
|---|---|---|
| JP | 11149348 | 6/1999 |
| JP | 2007310477 | 11/2007 |

OTHER PUBLICATIONS

Sigmund Clausen, "Idex SmartFinger Algorithms," White Paper, Idex ASA (Gamle Borgenvei 5, N-1385 Asker, Norway), Sep. 2002 (3 pages).

\* cited by examiner

*Primary Examiner* — Bipin Shalwala
*Assistant Examiner* — Hang Lin

(57) ABSTRACT

Direction of motion in a sensor array of a touch sensing device may be determined using a rule-based algorithm. A presence of a conductive object on a sensing device may be detected. First, second, and third locations of the detected presence of the conductive object may be determined. The first location may be compared with the second location using the rule-based algorithm, and a first direction of motion of the conductive object may be recognized based on the comparison. The second location may be compared with the third location using the rule-based algorithm, and the same first direction of motion of the conductive object may be recognized based on the comparison.

17 Claims, 10 Drawing Sheets

700

1. If f[i] = 0 (no finger), then g[i]=0;
2. If rule 1 does not apply, and if the most significant byte or the least significant byte of f[i]=1 and other bits are 0, then there is no end zero and g[i]=0.
3. If above rules do not apply, then compare f[i] to f[i-1]:
    If f[i-1]=f[i], then g[i]=0
    If f[i-1]<f[i], then g[i]=left; and
    If f[i-1]>f[i], then g[i]=right;

| f[i-1] | f[i] | rule | g[i] |
|---|---|---|---|
| 00000000=0 | 00000000=0 | no finger | 0 |
| 00000000=0 | 00000001=1 | no end zero | 0 |
| 00000001=1 | 00000011=3 | no end zero | 0 |
| 00000011=3 | 00000110=6 | compare(3,6) | LEFT |
| 00000110=6 | 00001100=12 | compare(6,12) | LEFT |
| 00001100=12 | 00011000=24 | compare(12,24) | LEFT |
| 00011000=24 | 00110000=48 | compare(24,48) | LEFT |
| 00110000=48 | 01100000=96 | compare(48,96) | LEFT |
| 01100000=96 | 11000000=192 | no end zero | 0 |
| 11000000=192 | 10000000=128 | no end zero | 0 |
| 10000000=128 | 00000000=0 | no finger | 0 |
| 00000000=0 | 00000000=0 | no finger | 0 |

| f[i-1] | f[i] | rule | g[i] |
|---|---|---|---|
| 00000000=0 | 00000000=0 | no finger | 0 |
| 00000000=0 | 10000000=128 | no end zero | 0 |
| 10000000=128 | 11000000=192 | no end zero | 0 |
| 11000000=192 | 01100000=96 | compare(192,96) | RIGHT |
| 01100000=96 | 00110000=48 | compare(96,48) | RIGHT |
| 00110000=48 | 00011000=24 | compare(48,24) | RIGHT |
| 00011000=24 | 00001100=12 | compare(24,12) | RIGHT |
| 00001100=12 | 00000110=6 | compare(12,6) | RIGHT |
| 00000110=6 | 00000011=3 | no end zero | 0 |
| 00000011=3 | 00000001=1 | no end zero | 0 |
| 00000001=1 | 00000000=0 | no finger | 0 |
| 00000000=0 | 00000000=0 | no finger | 0 |

FIG. 8B

METHOD AND APPARATUS TO DETERMINE DIRECTION OF MOTION IN A SENSOR ARRAY OF A TOUCH SENSING DEVICE

REFERENCE TO RELATED APPLICATION

This application claims the benefit of U.S. Provisional Application No. 60/932,337, filed May 29, 2007, entitled "Method of Determining Direction of Motion in a Sensor Array."

TECHNICAL FIELD

This application relates to the field of user interface devices, and, in particular, determining direction of motion in a sensor array of a touch sensing device.

BACKGROUND

Computing devices, such as notebook computers, personal data assistants (PDAs), and mobile handsets, have user interface devices, which are also known as human interface devices (HID). One type of user interface device includes a capacitive sensor interface. The user may bring a conductive object (e.g., a finger) in close proximity to the capacitive sensor interface, such as a touch-sensor slider, to activate a capacitive sensor. The touch-sensor slider may be embedded into a mobile handset or PDA, for instance, for built-in portability.

BRIEF DESCRIPTION OF THE DRAWINGS

The present embodiments are illustrated by way of example, and not by way of limitation, in the figures of the accompanying drawings.

FIG. 7 illustrates the rule-based logic algorithm used in recognizing the direction of motion of a conductive object on a sensing device.

FIGS. 8A and 8B illustrate examples of recognizing the direction of motion of a conductive object on a sensing device.

DETAILED DESCRIPTION

Described herein is a method and apparatus to determine direction of motion in a sensor array of a touch sensing device, such as a touch-sensor pad, or a touch-sensor slider. The following description sets forth numerous specific details, such as examples of specific systems, components, methods, and so forth, in order to provide a good understanding of several embodiments. It will be apparent to one skilled in the art, however, that at least some embodiments may be practiced without these specific details. In other instances, well-known components or methods are not described in detail or are presented in simple block diagram format. Thus, the specific details set forth are example embodiments. Particular implementations may vary from these specific details and still be contemplated to be within the spirit and scope of the present embodiments.

Embodiments of a method and apparatus are described to determine direction of motion in a sensor array of a touch sensing device. In an embodiment, the method may include detecting a presence of a conductive object on a sensing device. First, second, and third locations of the detected presence of the conductive object may be determined. The first location may be compared with the second location using a rule-based algorithm, and a first direction of motion of the conductive object may be recognized based on the comparison. The second location may be compared with the third location using the rule-based algorithm, and the same first direction of motion of the conductive object may be recognized based on the comparison.

Figure 1:
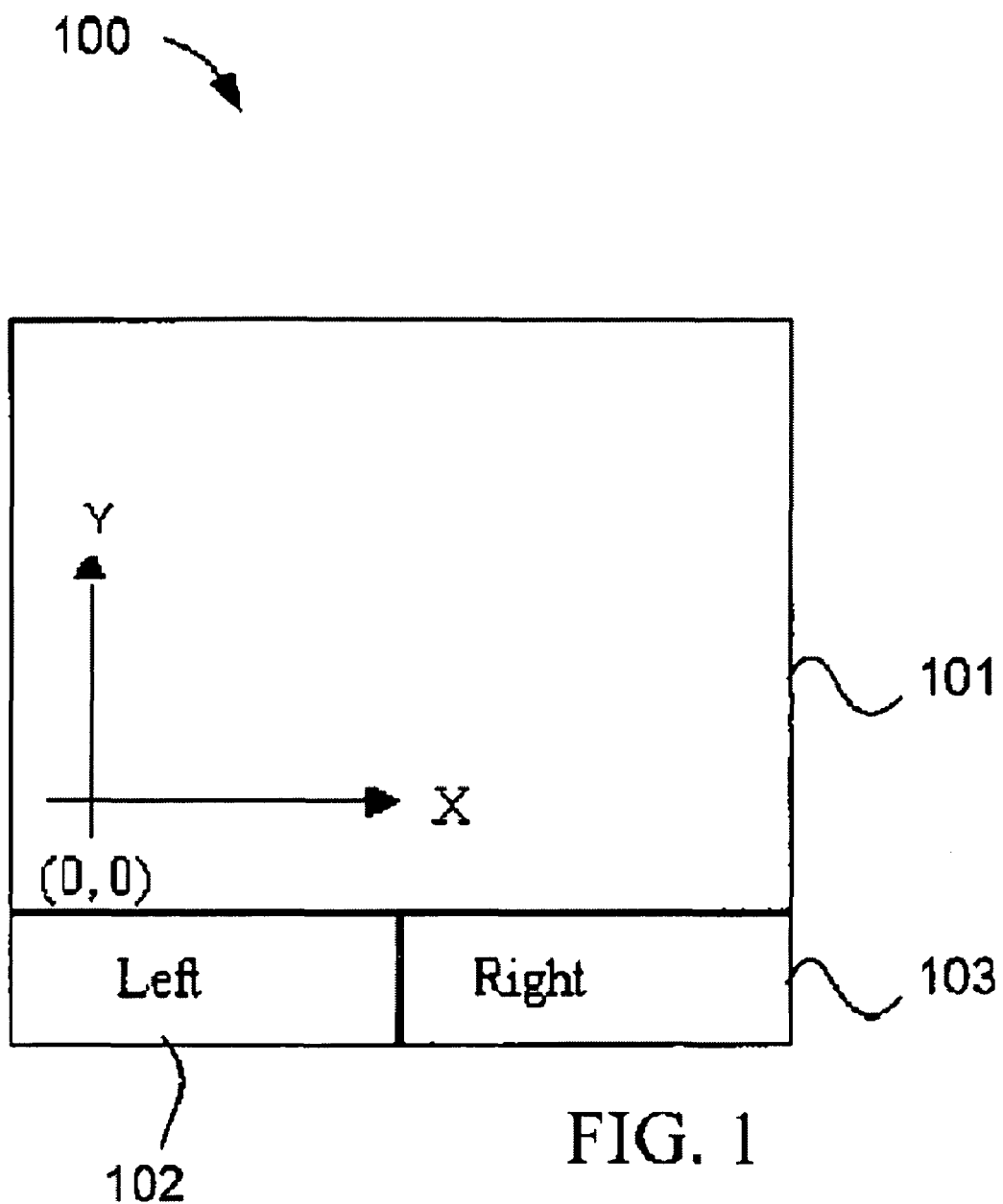
FIG. 1 illustrates a touch-sensor pad.

FIG. 1 illustrates a touch-sensor pad 100. The touch-sensor pad 100 includes a sensing surface 101 on which a conductive object (such as a finger) may be used to position a cursor in the x- and/or y-axes. Touch-sensor pad 100 may also include two buttons, left and right buttons 102 and 103, respectively. These buttons may be mechanical buttons or the like, and may operate much like a left and right button on a mouse. These buttons permit a user to select items on a display or send other commands to a computing device.

Motion of the conductive object is detected in one or two axes to control cursor movement. This touch-sensor pad 100 includes a capacitive position sensing system, which determines the position of the conductive object that is proximate to or touching the sensing surface 101. This touch-sensor pad also may obtain the conductive object (finger) pressure by summing the capacitances measured on sense lines. A finger is present if the pressure exceeds a suitable threshold value.

Figure 2:
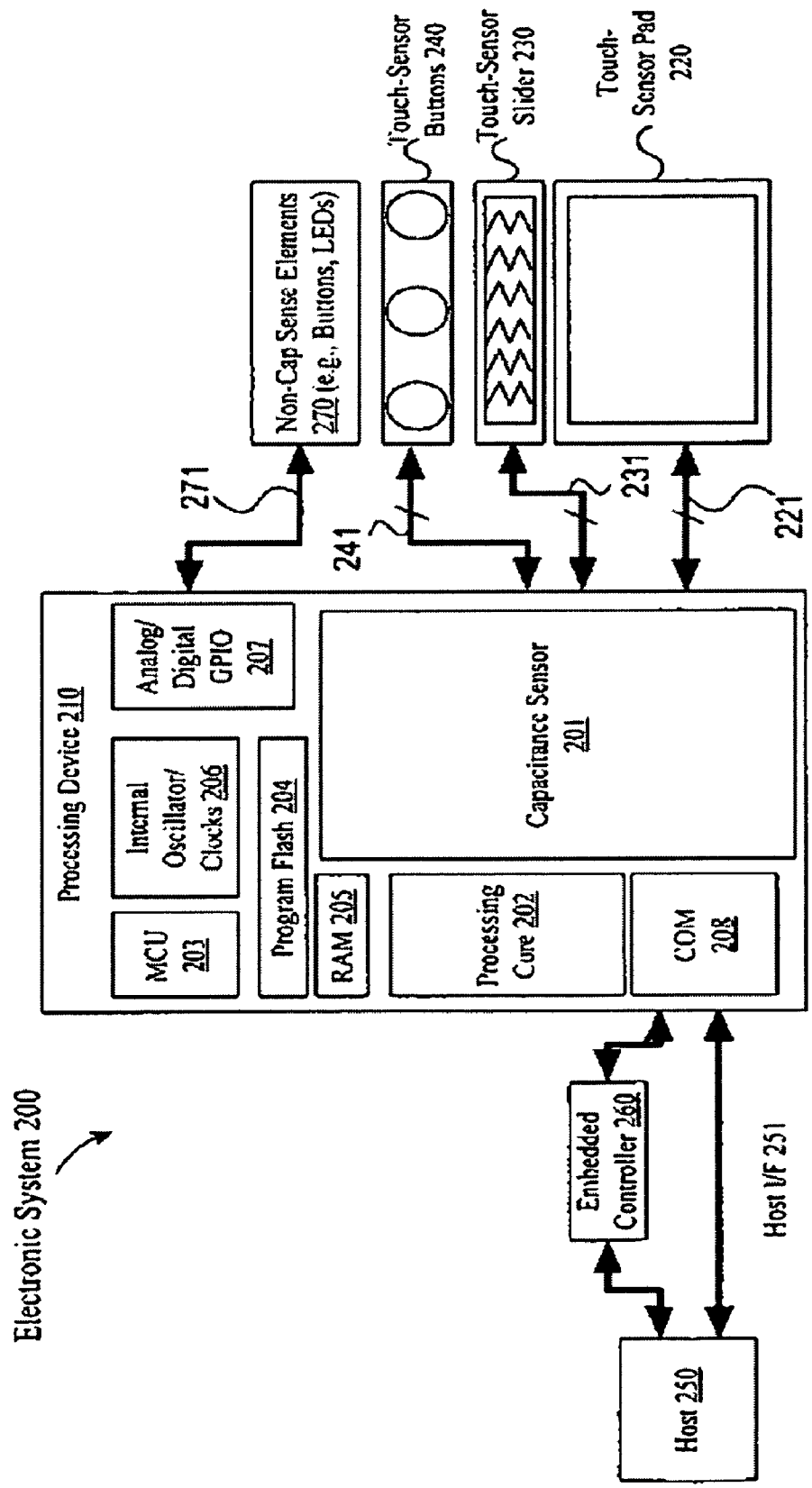
FIG. 2 illustrates a block diagram of one embodiment of an electronic system having a processing device to recognize a direction of motion of a conductive object on a sensing device.

FIG. 2 illustrates a block diagram of one embodiment of an electronic system 200 having a processing device 210 to recognize a direction of motion of the conductive object on the sensing device. Electronic system 200 includes processing device 210, touch-sensor pad 220, touch-sensor slider 230, touch-sensor buttons 240, host processor 250, embedded controller 260, and/or non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM) or the like, and program flash 204 may be a non-volatile storage or the like, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using configurable UMs. The analog block array may also be coupled to the GPIO 207.

As illustrated, capacitance sensor 201 may be integrated into processing device 210. Capacitance sensor 201 may include analog I/O for coupling to an external component, such as capacitive sensing devices. The sensing devices may include touch-sensor pad 220, touch-sensor slider 230, touch-sensor buttons 240, and/or other devices. The operations of the capacitive sensing devices may include, for example, notebook cursor operations, brightness control (dimmer), volume control, graphic equalizer control, speed control, and/or other control operations having gradual adjustments. It should also be noted that these embodiments of capacitive sensing implementations may be used in conjunction with non-capacitive sensing elements, including but not limited to pick buttons, sliders (for example, display brightness and contrast), scroll-wheels, multi-media control (for example, volume, track advance, etc.), handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array may comprise a plurality of sensor elements, organized as rows and columns. In an embodiment, the electronic system 200 includes a touch-sensor slider 230 coupled to the processing device 210 via bus 231. The touch-sensor slider 230 may have dimensions of 3 to 6 inches. The touch-sensor slider 230 may include a single-dimension sensor array. The single-dimension sensor array comprises a plurality of sensor elements, organized as rows, or alternatively, as columns, or as a curvilinear row. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array of the touch-sensor button comprises a plurality of sensor elements. For a touch-sensor button, the plurality of sensor elements may be coupled together to detect a presence of a conductive object over the entire surface of the sensing device. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not specify capacitance sensing. In one embodiment, buses 271, 241, 231, and 221 may be a single bus. Alternatively, these buses may be configured into any combination of one or more separate buses.

The processing device may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206, and communication block 208. The oscillator/clocks block 206 provides clock signals to one or more of the components of processing device 210. Communication block 208 may be used to communicate with an external component, such as a host (or host processor) 250, via host interface (I/F) line 251. Alternatively, processing block 210 may also be coupled to embedded controller 260 to communicate with the external components, such as host 250. Interfacing to the host 250 can be through various methods. In one embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interface (SPI). The embedded controller 260 and/or host 250 may be coupled to the processing device 210 with a ribbon or flex cable from an assembly, which houses the touch-sensor pad and processing device.

In one embodiment, the processing device 210 is configured to communicate with the embedded controller 260 or the host 250 to send data. The data may be a command or, alternatively, a signal. The data may include detection of direction of a conductive object in a sensor array. In an embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

The processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, step Forward, and the like. The data may include detection of direction of a conductive object in a sensor array. Other user interface device commands may be communicated to the host 250 from the processing device 210. These commands may be based on gestures occurring on the sensing device that are recognized by the processing device, such as tap, push, hop, zigzag and other like gestures. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. For example, scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one embodiment, processing device 210 may be a Programmable System on a Chip (PSoC™) processing device, manufactured by Cypress Semiconductor Corporation, San Jose, Calif. Alternatively, processing device 210 may be one or more suitable types of processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer or the like. Alternatively, the electronic system may be used in other applications, such as, for example, a mobile handset, a personal data assistant (PDA), a keyboard, a television, a remote control, a monitor, a handheld multi-media device, a handheld video player, a handheld gaming device, a control panel, or other like device.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that capacitance may be measured using a relaxation oscillator, current versus voltage phase shift measurement, resistor-capacitor charge timing, capacitive bridge divider, Sigma-Delta modulator, or charge transfer.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may specify very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments.

Figure 3A:
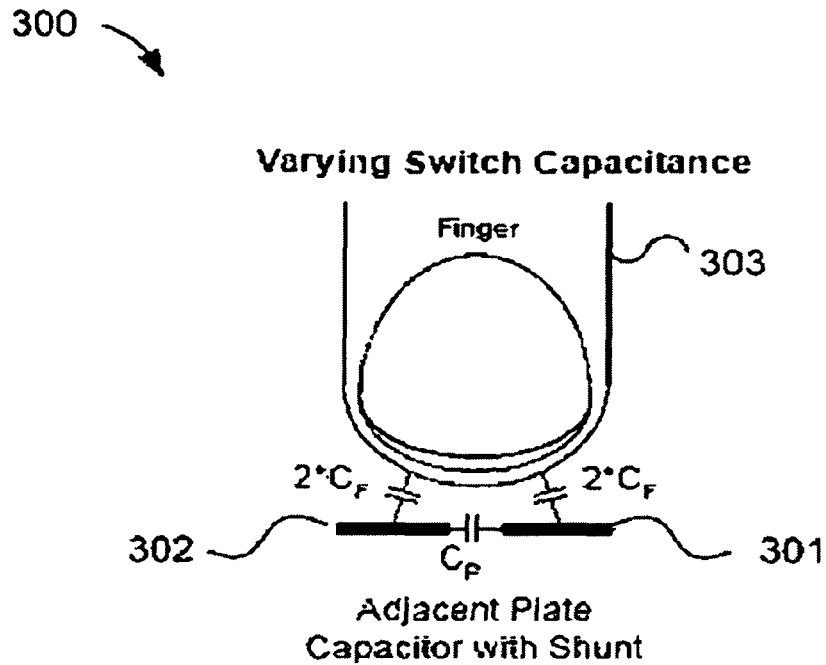
FIG. 3A illustrates a varying switch capacitance.
Figure 3B:
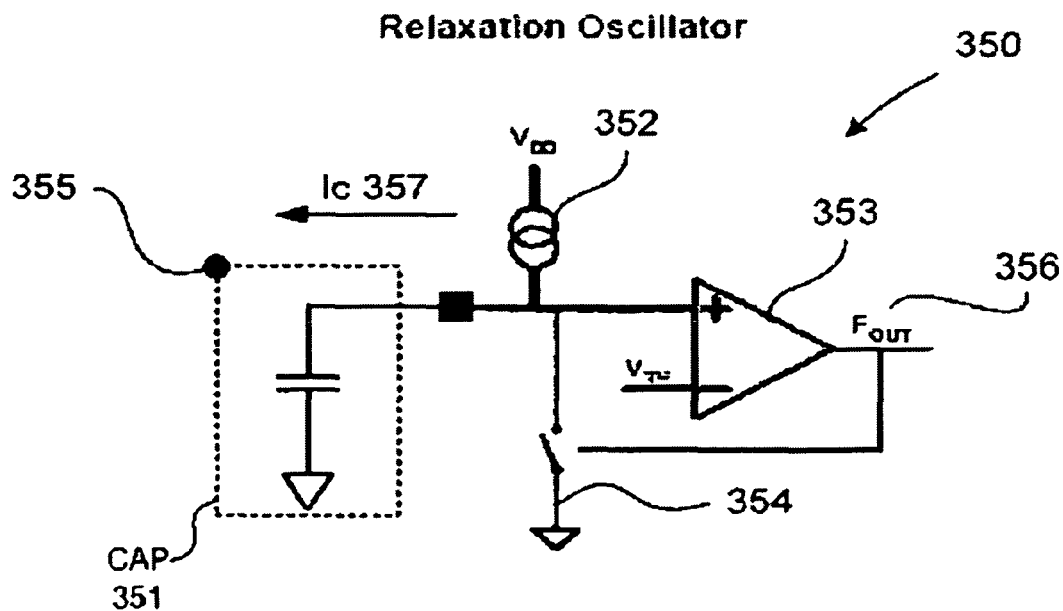
FIG. 3B illustrates one embodiment of a relaxation oscillator.

FIG. 3A illustrates a varying switch capacitance. In its basic form, a capacitive switch 300 is a pair of adjacent plates 301 and 302. There is a small edge-to-edge capacitance $C_P$, but the intent of switch layout is to minimize the base capacitance $C_P$ between these plates. When a conductive object 303 (e.g., finger) is placed in proximity to the two plate 301 and 302, there is a capacitance $2*C_F$ between one electrode 301 and the conductive object 303 and a similar capacitance $2*C_F$ between the conductive object 303 and the other electrode 302. The capacitance between one electrode 301 and the conductive object 303 and back to the other electrode 302 adds in parallel to the base capacitance $C_P$ between the plates 301 and 302, resulting in a change of capacitance $C_F$. Capacitive switch 300 may be used in a capacitance switch array. The capacitance switch array is a set of capacitors where one side of each is grounded. Thus, the active capacitor (as represented in FIG. 3B as capacitor 351) has only one accessible side. The presence of the conductive object 303 increases the capacitance $(C_P+C_F)$ of the switch 300 to ground. Determining switch activation is then a matter of measuring change in the capacitance $(C_F)$. Switch 300 is also known as a grounded variable capacitor. In one embodiment, $C_F$ may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system.

FIG. 3B illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current ($I_c$) 357 in a single direction onto a device under test ("DUT") capacitor, capacitor 351. As the charging current piles charge onto the capacitor 351, the voltage across the capacitor increases with time as a function of $I_c$ 357 and its capacitance C. Equation (1) describes the relation between current, capacitance, voltage and time for a charging capacitor:

$$CdV=I_c dt \quad (1)$$

The relaxation oscillator begins by charging the capacitor 351 from a ground potential or zero voltage and continues to pile charge on the capacitor 351 at a fixed charging current $I_c$ 357 until the voltage across the capacitor 351 at node 355 reaches a reference voltage or threshold voltage, $V_{TH}$ 355. At $V_{TH}$ 355, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current $I_c$ 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 355. This sets a practical upper limit to the operating frequency. For example, if capacitance C of the capacitor 351 changes, then $f_{RO}$ may change proportionally according to Equation (1). By comparing $f_{RO}$ of $F_{OUT}$ 356 against the frequency ($f_{REF}$) of a known reference system clock signal (REF CLK), the change in capacitance ΔC can be measured. Accordingly, equations (2) and (3) below describe that a change in frequency between $F_{OUT}$ 356 and REF CLK is proportional to a change in capacitance of the capacitor 351.

$$\Delta C \text{ varies } \Delta f, \text{ where} \quad (2)$$

$$\Delta f = f_{RO} - f_{REF} \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one embodiment, the relaxation oscillator 350 may be built using a 555 timer to implement the comparator 353 and reset switch 354. Alternatively, the relaxation oscillator 350 may be built using other circuiting. Additional details regarding operation of relaxation oscillators have not been included so as to not obscure the present embodiments.

Figure 4:
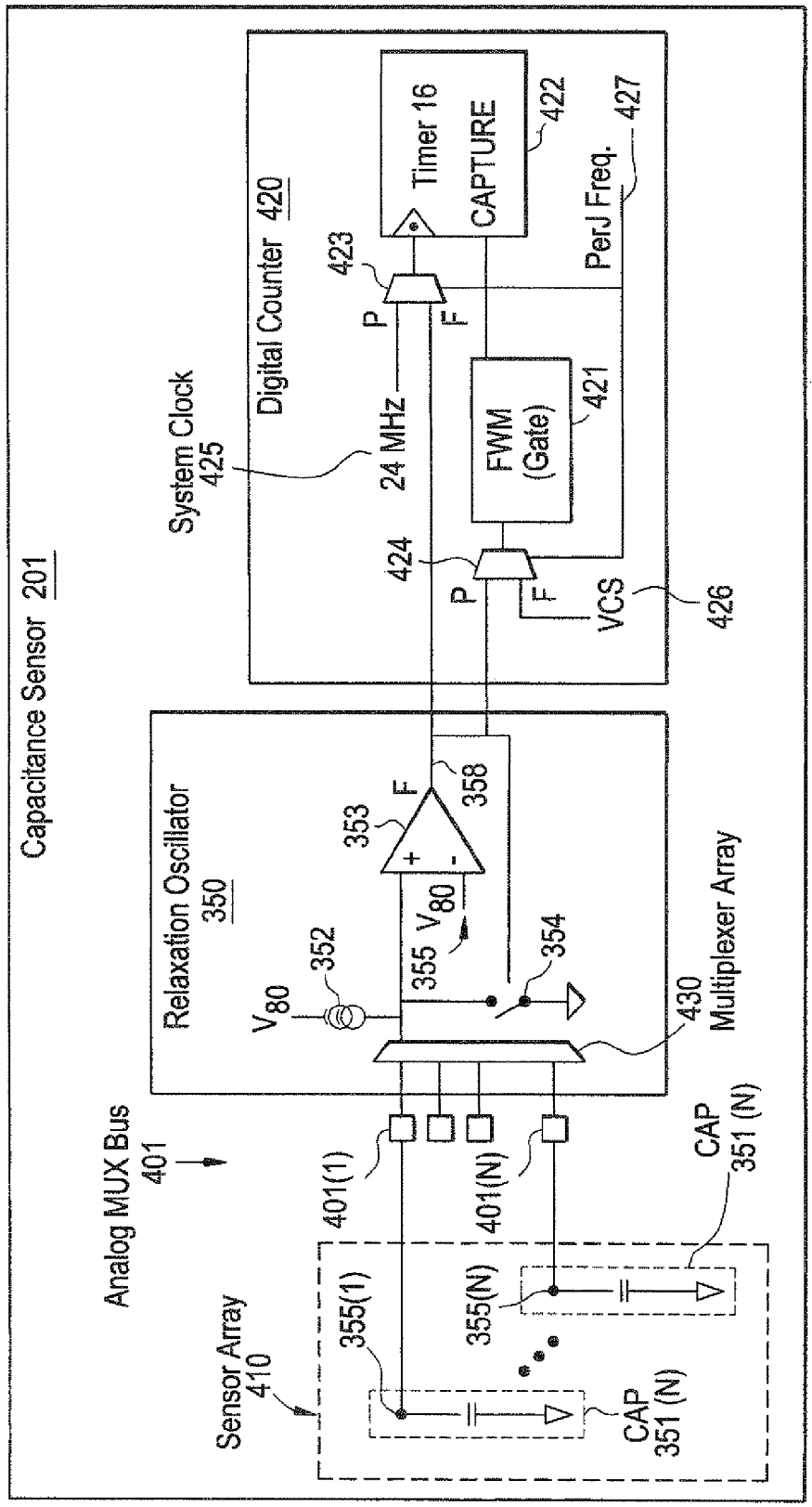
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes a plurality of sensor elements 355(1)-355(N), where N is a positive integer value that represents the number of rows (or alternatively columns) of the sensor array 410. Each sensor element is represented as a capacitor, as previously described with respect to FIG. 3B. The sensor array 410 is coupled to relaxation oscillator 350 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3B, and a selection circuit 430. The selection circuit 430 is coupled to the plurality of sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the plurality of sensor elements to provide the charge current and to measure the capacitance of each sensor element. In one embodiment, the selection circuit 430 is a multiplexer array of the relaxation oscillator 350. Alternatively, the selection circuit 430 may be other suitable circuitry outside the relaxation oscillator 350, or even outside the capacitance sensor 201 to select the sensor element to be measured. Capacitance sensor 201 may include one relaxation oscillator and digital counter for the plurality of sensor elements of the sensor array. Alternatively, capacitance sensor 201 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all rows are simultaneously moved, to obtain a complete set of sampled points simultaneously giving a profile of the conductive object in the other dimension.

In another embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As previously described with respect to the relaxation oscillator 350, when a finger or conductive object is placed on the switch, the capacitance increases from $C_p$ to $C_p+C_f$ so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 441 is clocked for a fixed period by a derivative of the system clock, VC3 426 (which is a divider from the 24 MHz system clock 425). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As previously described, pulse width modulation is a modulation technique that generates variable-length pulses to represent the amplitude of an analog input signal; in this case the relaxation oscillator output signal 356. The output of the PWM 421 enables a timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software load and the values of the switch capacitances. The frequency measurement method has a fixed-switch data acquisition rate.

The length of the counter 422 and the detection time specified for the switch are determined by sensitivity specifications. Small changes in the capacitance on capacitor 351 result in small changes in frequency. In order to find these small changes, counting for a considerable time may be completed.

At startup (or boot) the switches (e.g., capacitors 351(1)-(N)) are scanned and the count values for each switch with no actuation are stored as a baseline array ($C_p$). The presence of a finger on the switch is determined by the difference in counts between a stored value for no switch actuation and the acquired value with switch actuation, referred to here as $\Delta n$. The sensitivity of a single switch is approximately:

$$\Delta n/n = C_f/C_p \quad (4)$$

The value of $\Delta n$ should be large enough for reasonable resolution and clear indication of switch actuation. This drives switch construction decisions.

$C_f$ should be as large a fraction of $C_p$ as possible. In one embodiment, the fraction of $C_f/C_p$ ranges between approximately 0.01 to approximately 2.0. Alternatively, other fractions may be used for $C_f/C_p$. Since $C_f$ is determined by finger area and distance from the finger to the switch's conductive traces (through the over-lying insulator), the baseline capacitance Cp should be minimized. The baseline capacitance $C_p$ includes the capacitance of the switch pad plus any parasitics, including routing and chip pin capacitance.

In switch array applications, variations in sensitivity should be minimized. If there are large differences in $\Delta n$, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one embodiment, a 0.062 inch thick PCB is used. Alternatively, other thicknesses may be used, for example, a 0.015 inch thick PCB.

It should be noted that the count window should be long enough for $\Delta n$ to be a "significant number." In one embodiment, the "significant number" can be as little as 10, or alternatively, as much as several hundred. In one embodiment, where $C_f$ is 1.0% of $C_P$ (a typical "weak" switch), and where the switch threshold is set at a count value of 20, n is found to be:

$$n = \Delta n * [C_f/C_p] = 2000 \quad (5)$$

Adding some margin to yield 2500 counts, and running the frequency measurement method at 1.0 MHz, the detection time for the switch is 4 microseconds. In the frequency measurement method, the frequency difference between a switch with and without actuation (i.e., $C_P + C_F$ vs. $C_P$) is approximately:

$$\Delta n = t_{count} * i_c / V_{TH} * C_f / C_p^2 \tag{6}$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{periods} * C_f * V_{TH} / i_c * f_{sysclk} \tag{7}$$

The charge currents are typically lower and the period is longer to increase sensitivity, or the number of periods for which $f_{sysclk}$ is counted can be increased. In either method, by matching the static (parasitic) capacitances Cp of the individual switches, the repeatability of detection increases, making all switches work at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as previously described. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 353 are connected to the analog mux bus. This may limit the pin-count specification to simply the number of switches (e.g., capacitors 351(1)-351(N)) to be addressed. In one embodiment, no external resistors or capacitors are specified inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent PCB pads or traces, as indicated in FIG. 3A. Typically, one of these plates is grounded. Layouts for touch-sensor slider (e.g., linear slide switches or curved or circular slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). In calculating the capacitance of two parallel plates, fringing effects that substantially increase the switch-to-ground (and PCB trace-to-ground) capacitance may be taken into account.

Switch sensitivity (i.e., actuation distance) may be increased by one or more of the following: 1) increasing board thickness to increase the distance between the active switch and any parasitics; 2) minimizing PC trace routing underneath switches; 3) utilizing a gridded ground with 50% or less fill if use of a ground plane is specified; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches may be used to control gradual adjustments. Examples include a lighting control (dimmer), volume control, graphic equalizer, and speed control. These switches are mechanically adjacent to one another. Actuation of one switch may result in partial actuation of physically adjacent switches. In one embodiment, the actual position in the sliding switch is found by computing the centroid location of the set of switches activated. By comparing two or more samples of the centroid over time, direction of motion of the conductive object may be detected. Computing the centroid involves a 24-bit multiply/divide using difference counts from each sensor, which may be a relatively slow calculation that utilizes memory and consumes power.

In applications for touch-sensor sliders (e.g., sliding switches) and touch-sensor pads, finger (or other capacitive object) position is determined to more resolution as compared with the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The specification is for some number of adjacent switch signals to be above a noise threshold. When the strongest signal is found, this signal and those immediately adjacent are used to compute a centroid. The centroid calculates the estimated position of the conductive object on the array.

In another embodiment, the direction of motion of the capacitive object is found by a rule-based algorithm described herein. Using this rule-based algorithm, rather than comparing two or more samples of the centroid over time, direction of motion of the conductive object may be detected relatively faster, with fewer calculations, utilizing less memory, and consuming less power. Because the rule-based algorithm may not calculate the absolute position of the conductive object (e.g., using centroid method described above), substantial processing time may be saved in comparison to the centroid method in detecting the direction of the conductive object.

The rule-based algorithm may be implemented as a simple state machine adding slider support without general purpose analog or digital blocks.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, used for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity specifications. In one embodiment, the PCB thickness is at least approximately 0.3 millimeters (mm). Alternatively, the PCB may have other thicknesses. It should be noted that thicker PCBs may yield better results. The PCB length and width is dependent on individual design specifications for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, Mylar™ or the like. Alternatively, other materials known by those of ordinary skill in the art may be used. In one embodiment, the overlay has a thickness of approximately 1.0 mm. In another embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces used to define the rows and columns of the sensor array.

Figure 5A:
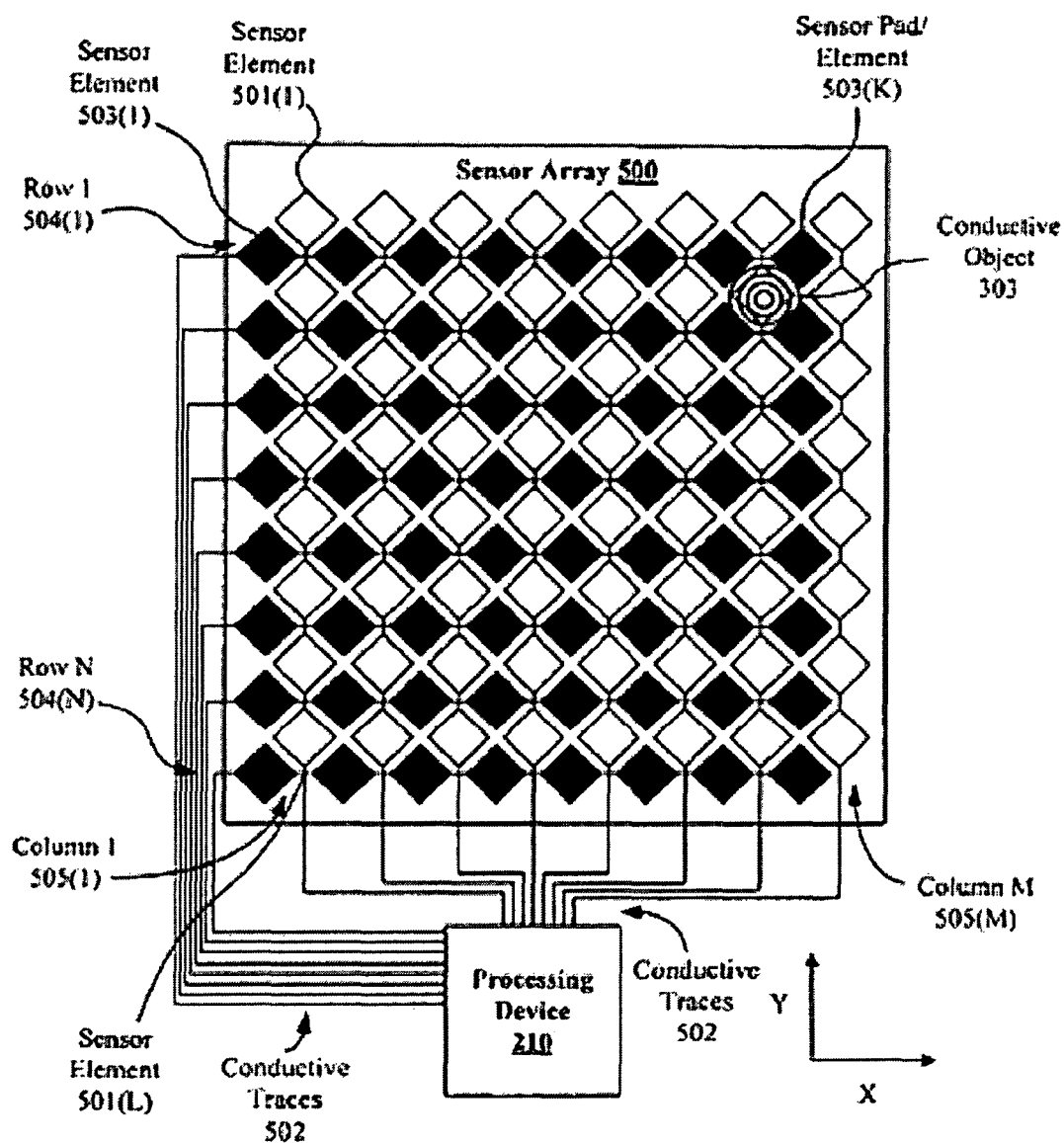
FIG. 5A illustrates a top-side view of one embodiment of a sensor array having a plurality of sensor elements to detect a presence of a conductive object on the sensor array of a touch-sensor pad.

FIG. 5A illustrates a top-side view of one embodiment of a sensor array having a plurality of sensor elements for detecting a presence of a conductive object 303 on the sensor array 500 of a touch-sensor pad. Touch-sensor pad 220 includes a sensor array 500. Sensor array 500 includes a plurality of rows 504(1)-504(N) and a plurality of columns 505(1)-505(M), where N is a positive integer value representative of the number of rows and M is a positive integer value representative of the number of columns. Each row includes a plurality of sensor elements 503(1)-503(K), where K is a positive integer value representative of the number of sensor elements in the row. Each column includes a plurality of sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
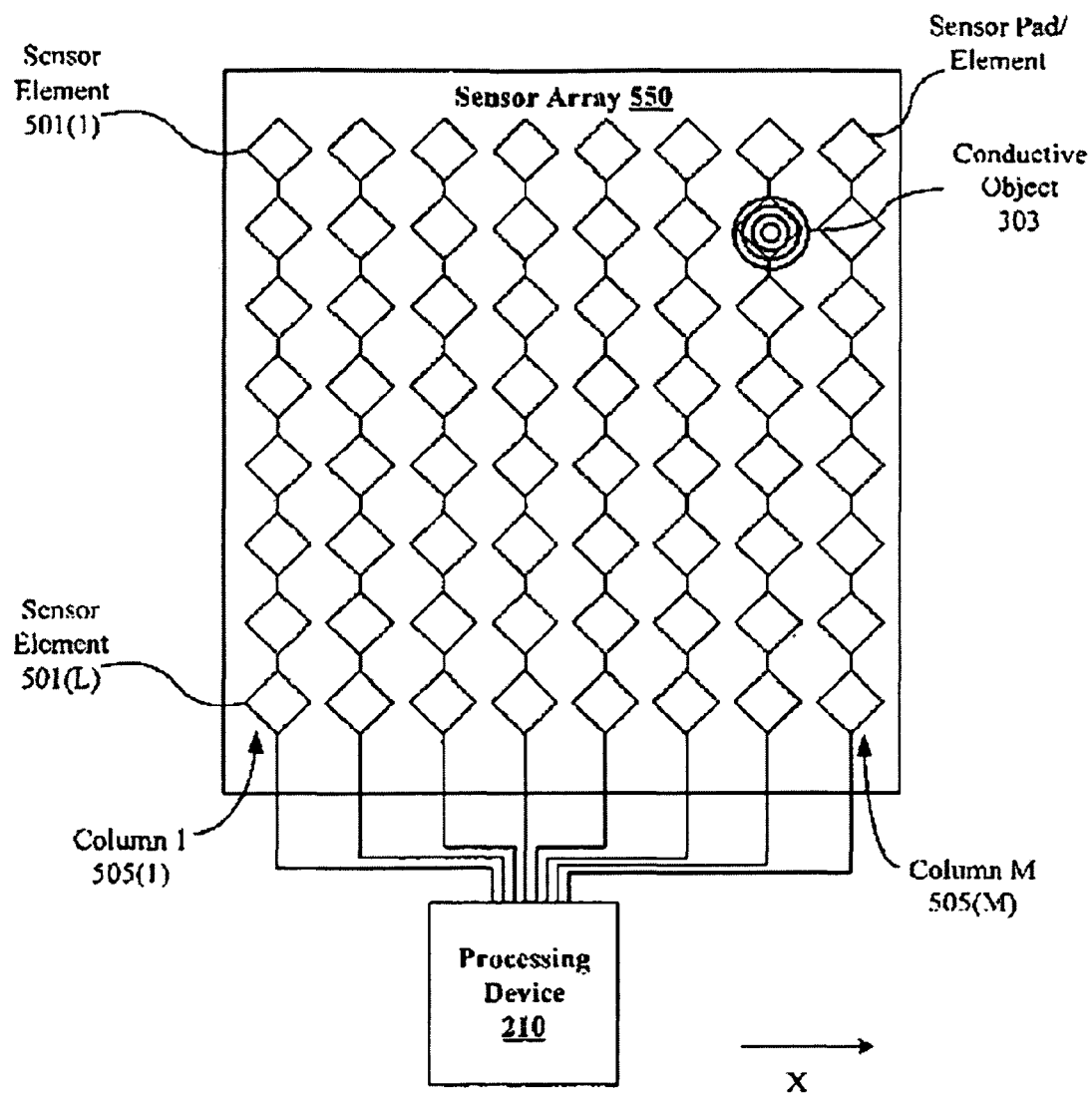
FIG. 5B illustrates a top-side view of one embodiment of a sensor array having a plurality of sensor elements to detect a presence of a conductive object on the sensor array of a touch-sensor slider.

FIG. 5B illustrates a top-side view of one embodiment of a sensor array having a plurality of sensor elements for detecting a presence of a conductive object 303 on the sensor array 550 of a touch-sensor slider. Touch-sensor slider 230 includes a sensor array 550. Sensor array 550 includes a plurality of columns 504(1)-504(M), where M is a positive integer value representative of the number of columns. Each column includes a plurality of sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars), however, this design may include additional layers in the PCB to allow the vertical and horizontal bars to be positioned on the PCB so that they are not in contact with one another.

Figure 5C:
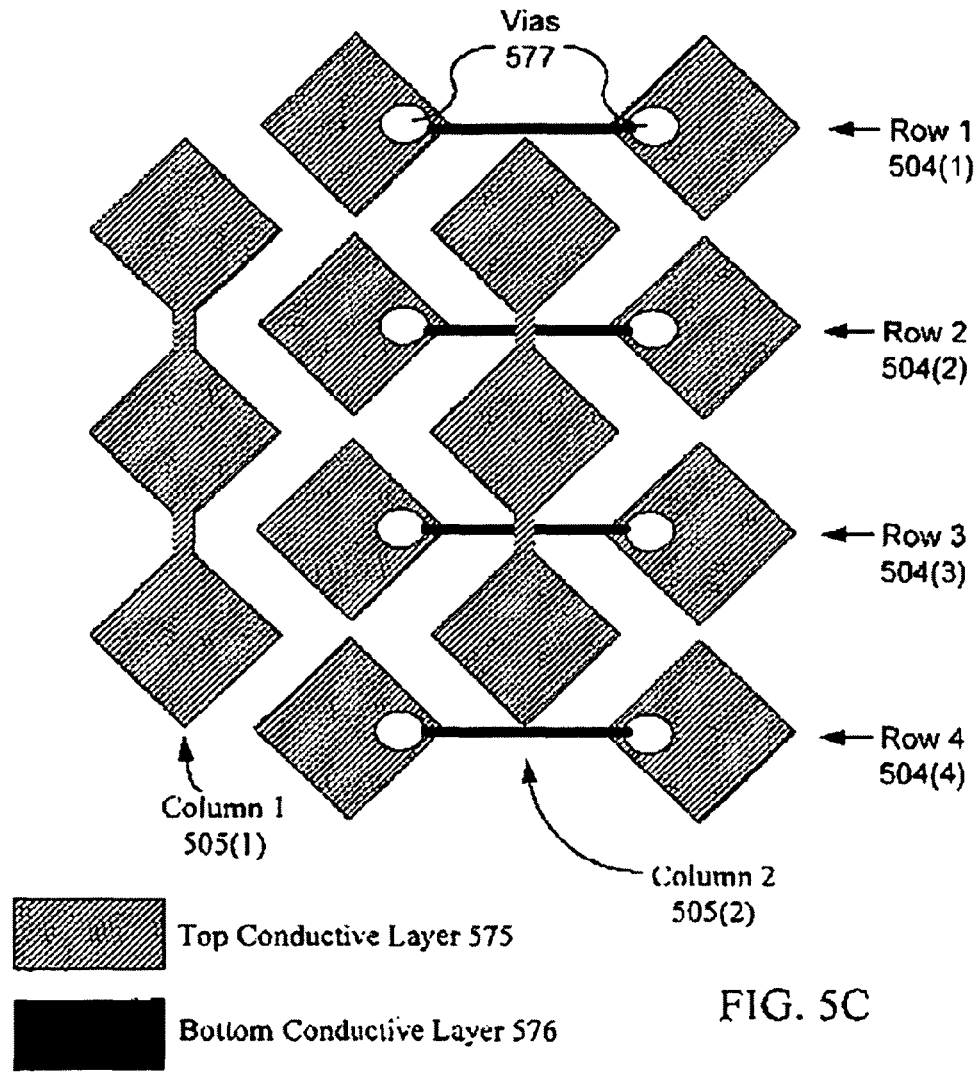
FIG. 5C illustrates a top-side view of an embodiment of a two-layer touch-sensor pad.
Figure 5D:
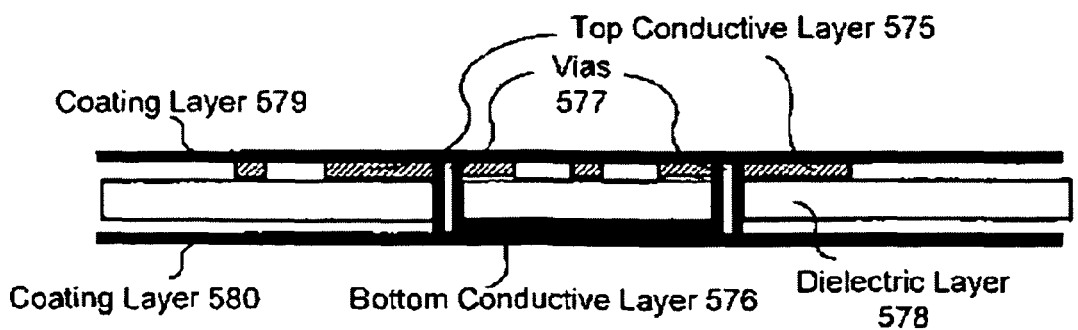
FIG. 5D illustrates a side view of an embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 575 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 89 are applied to the surfaces opposite to the surfaces that are coupled to the dielectric layer 578 on both the top and bottom conductive layers 575 and 576.

It should be noted that the present embodiments should not be limited to connecting the sensor elements of the rows using vias to the bottom conductive layer 576, but may include connecting the sensor elements of the columns using vias to the bottom conductive layer 576.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement may be in a location other than the center. The processing device IC is not specified to have a specific set of dimensions for a touch-sensor pad, nor a certain number of pins. Alternatively, the IC may be placed somewhere external to the PCB.

Figure 6:
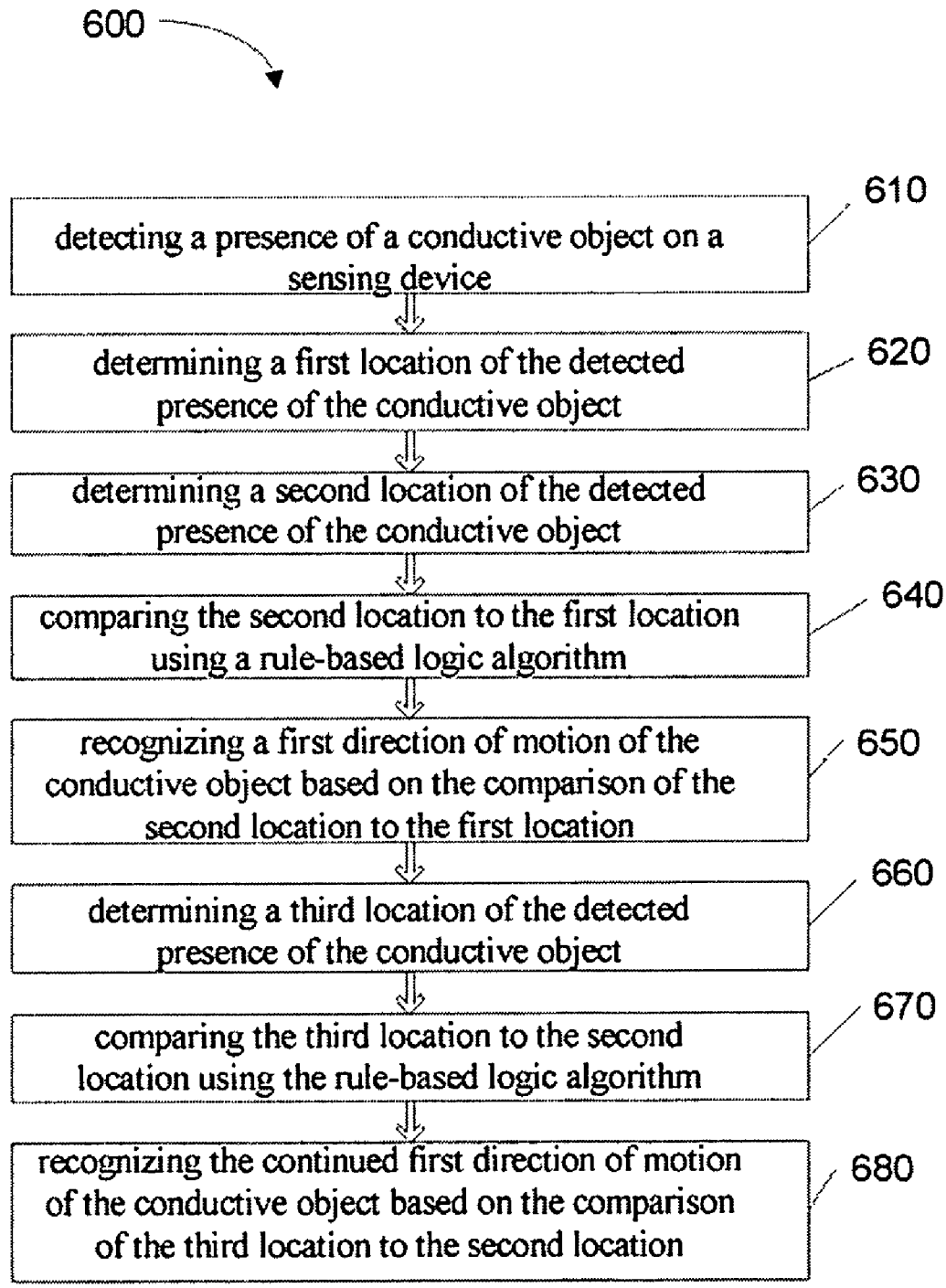
FIG. 6 illustrates a flowchart of an embodiment of a method to recognize a direction of motion of a conductive object on a sensing device.

FIG. 6 illustrates a flowchart 600 of an embodiment of a method to recognize a direction of motion of a conductive object on a sensing device. At block 610, a presence of a conductive object, such as a finger, is detected on a sensing device by the processing device 210. A sensing element in the sensing array may reach a threshold level of, for example, time, pressure, or capacitance, to detect the presence of a conductive object. For example, if a pressure and time associated with the conductive object exceeds a predetermined threshold level the presence may be detected. At blocks 620 and 630, first and second locations of the detected presence of the conductive object is determined by the processing device 210. At block 640, using a rule-based algorithm described with regard to FIG. 7, the second location is compared with the first location. At block 650, a first direction of motion (such as, left, right, up, or down) of the conductive object is recognized based on the comparison at block 640 by the processing device 210. At block 660, a third location of the detected presence of the conductive object is determined. At block 670, the third location is compared with the second location using the rule-based logic algorithm of FIG. 7. At block 680, the continued first direction of motion (such as left, right, up, or down) of the conductive object is recognized based on the comparison at block 670. If the direction determined at block 650 is left, the continued first direction at block 680 is left as well. If the direction determined at block 650 is right, the continued first direction at block 680 is right as well. If the direction determined at block 650 is up, the continued first direction at block 680 is up as well. If the direction determined at block 650 is down, the continued first direction at block 680 is down as well. If the direction determined at block 650 is clockwise, the continued first direction at block 680 is clockwise as well. If the direction determined at block 650 is counter clockwise, the continued first direction at block 680 is counter clockwise as well.

In another embodiment, there is a fourth location of the detected presence of the conductive object determined by the processing device 210. The fourth location is compared to the third location using the rule-based logic algorithm of FIG. 7 and a second direction of motion opposite the first direction of motion of the conductive object is recognized based on the comparison of the fourth location to the third location. The fourth location may be the same location as the second location or may be different.

The processing device includes a capacitance sensor 201 coupled to the plurality of sensor elements, such as those on slider 230. The capacitance sensor 201 is configured to measure a capacitance on each sensor element as described herein. The processing device is configured to send data to an external component (such as host 250) when the direction of motion of the conductive object is recognized.

FIG. 7 illustrates the rule-based logic algorithm 700 used in recognizing the direction of motion of a conductive object on a sensing device. There are three rules to apply in the algorithm as follows:

1. If f[i]=0 (no finger), then g[i]=0;
2. If rule 1 does not apply, and if the most significant byte (MSB) or the least significant byte (LSB) of f[i]=1 and other bits are 0, then there is no end zero, and g[i]=0.
3. If above rules do not apply, then compare f[i] to f[i−1]:
   If f[i−1]=f[i], then g[i]=0
   If f[i−1]<f[i], then g[i]=left; and
   If f[i−1]>f[i], then g[i]=right;
   where:

f[i]=current sample of sensor mask(t);
f[i−1]=previous sample of sensor mask(t);
g[i]=output of direction detection algorithm; and
t=time.

In the first rule, the sensing element in the sensing array does not reach a threshold level to detect the presence of a conductive object. The second rule and the third rule are explained with regard to FIGS. 8A and 8B.

FIGS. 8A and 8B illustrate examples 800, 810 of recognizing the direction of motion of a conductive object on a sensing device. In the example 800 of FIG. 8A, the conductive object is moving left with relatively constant pressure and there may be a relatively balanced sensor response. The high resolution count value from each sensor in the slider group, for example, is mapped into an on/off state using threshold levels. The sensor mask is a register that holds the on/off states for the slider (or another array) group. The function f[ ] is used to denote samples of the sensor mask register. One bit may be assigned to each sensor in the array. Each bit (0 or 1) represents a sensor element in a sensor array. In the example shown, there are 8 sensors. In this example, a minimum amount of activity is present before g[i] registers a left movement of the conductive object. Particularly, if there is no end zero associated with the MSB or LSB, then g[i]=0. In the example 810 of FIG. 8B, the conductive object is moving right with relatively constant pressure and there may be a relatively balanced sensor response.

The rule-based algorithm for direction detection may be made more robust using additional rules in logic so that the system may work with lighter or heavier touch (pressure), sensor mismatch, sensors not being consistent, finger pressure not being consistent, and/or noisy sensors. For example, g[i] may not have a sequence of all Left or all Right. Such an example sequence might look like: 0, 0, left, left, right, left, left, 0,0. In this example, the rule for direction detection may be determined by the balance of lefts and rights in a given period. Because there are 4 count Left direction and 1 count Right direction, the direction of sequence using the count balance rule is "Left."

The minimum number of sensors used for application of the rule-based algorithm described herein is equal to the number of sensors active with the heaviest touch, plus the predetermined minimum number of lefts or rights used to make a decision.

Embodiments, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium;

read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It will be evident that various modifications and changes may be made to the described embodiments without departing from the broader spirit and scope thereof. The specification and drawings are, accordingly, to be regarded in an illustrative sense rather than a restrictive sense.

What is claimed is:

1. A method to determine direction of motion in a sensor array of a touch sensing device, comprising:
   detecting a presence of a conductive object on a sensing device;
   determining a first location of the detected presence of the conductive object;
   determining a second location of the detected presence of the conductive object;
   comparing the second location to the first location using a rule-based logic algorithm;
   recognizing a first direction of motion of the conductive object based on the comparison of the second location to the first location;
   determining a third location of the detected presence of the conductive object;
   comparing the third location to the second location using the rule-based logic algorithm; and
   recognizing a continued first direction of motion of the conductive object based on the comparison of the third location to the second location,
   wherein the rule-based logic algorithm includes:
      if f[i]=0, then g[i]=0;
      if f[i−1]=f[i], then g[i]=0;
      if f[i−1]<f[i], then g[i]=left; and
      if f[i−1]>f[i], then g[i]=right;
      where:
         f[i]=current sample of sensor mask(t);
         f[i−1]=previous sample of sensor mask(t);
         g[i]=output of direction detection algorithm; and
         t=time.

2. The method of claim 1, further comprising:
   determining a fourth location of the detected presence of the conductive object;
   comparing the fourth location to the third location using the rule-based logic algorithm; and
   recognizing a second direction of motion of the conductive object based on the comparison of the fourth location to the third location.

3. The method of claim 1, wherein the conductive object includes a finger.

4. A non-transitory machine-readable medium that provides instructions that, if executed by a machine, will cause the machine to perform operations comprising:
   detecting a presence of a conductive object on a sensing device;
   determining a first location of the detected presence of the conductive object;
   determining a second location of the detected presence of the conductive object;
   comparing the second location to the first location using a rule-based logic algorithm;
   recognizing a first direction of motion of the conductive object based on the comparison of the second location to the first location;
   determining a third location of the detected presence of the conductive object;
   comparing the third location the second location using the rule-based logic algorithm; and
   recognizing a continued first direction of motion of the conductive object based on the comparison of the third location to the second location,
   wherein the rule-based logic algorithm includes:
      if f[i]=0, then g[i]=0;
      if f[i−1]=f[i], then g[i]=0;
      if f[i−1]<f[i], then g[i]=left; and
      if f[i−1]>f[i], then g[i]=right;
      where:
         f[i]=current sample of sensor mask(t);
         f[i−1]=previous sample of sensor mask(t);
         g[i]=output of direction detection algorithm; and
         t=time.

5. An apparatus, comprising:
   a sensing device having a plurality of sensor elements to detect a presence of conductive object on the sensing device; and
   a processing device coupled to the sensing device, wherein the processing device is configured to:
      detect a presence of a conductive object on a sensing device;
      determine a first location of the detected presence of the conductive object;
      compare the second location to the first location using a rule-based logic algorithm;
      recognize a first direction of motion of the conductive object based on the comparison of the first and second locations;
      determine a third location of the detected presence of the conductive object;
      compare the third location to the second location using the rule based logic algorithm; and
      recognize a continued first direction of motion of the conductive object based on the comparison of the second and third locations,
      wherein the rule-based logic algorithm includes:
         if f[i]=0, then g[i]=0;
         if f[i−1]=f[i], then g[i]=0;
         if f[i−1]<f[i], then g[i]=left; and
         if f[i−1]>f[i], then g[i]=right;
         where:
            f[i]=current sample of sensor mask(t);
            f[i−1]=previous sample of sensor mask(t);
            g[i]=output of direction detection algorithm; and
            t=time.

6. The apparatus of claim 5, wherein the processing device is further configured to:
   determine a fourth location of the detected presence of the conductive object;

compare the fourth location to the third location using the rule-based logic algorithm; and recognize a second direction of motion opposite the first direction of motion of the conductive object base on the comparison of the fourth location of the third location.

7. The apparatus of claim 5, wherein the processing device includes a capacitance sensor coupled to the plurality of the sensor elements, and wherein the capacitance sensor is configured to measure a capacitance on each sensor element.

8. The apparatus of claim 5, further comprising:
a component external to the processing device, wherein the processing device is configured to send data to the component when the direction of motion of the conductive object is recognized.

9. The apparatus of claim 8, wherein the component external to the processing device comprises a processor.

10. The apparatus of claim 8, wherein the component external to the processing device comprises a driver of a processor.

11. The apparatus of claim 8, wherein the component external to the processing device comprises an embedded controller.

12. The apparatus of claim 8, wherein the data includes at least one of a command and a signal.

13. The apparatus of claim 5, wherein the conductive object includes a finger.

14. The apparatus of claim 5, wherein the sensing device includes at least one of a single-dimension sensor array comprising the plurality of sensor elements and a multi-dimension sensor array comprising the plurality of sensor elements.

15. The apparatus of claim 5, wherein the sensing device includes at least one of a touch-sensor pad and a touch-sensor slider.

16. The apparatus of claim 5, wherein the sensing device is mounted on a mobile handset.

17. The apparatus of claim 6, wherein the processing device is configured to determine direction detection in a sequence where differing directions are recognized by a count balance rule.

* * * * *